329# United States Patent Office 3,470,494
Patented Sept. 30, 1969

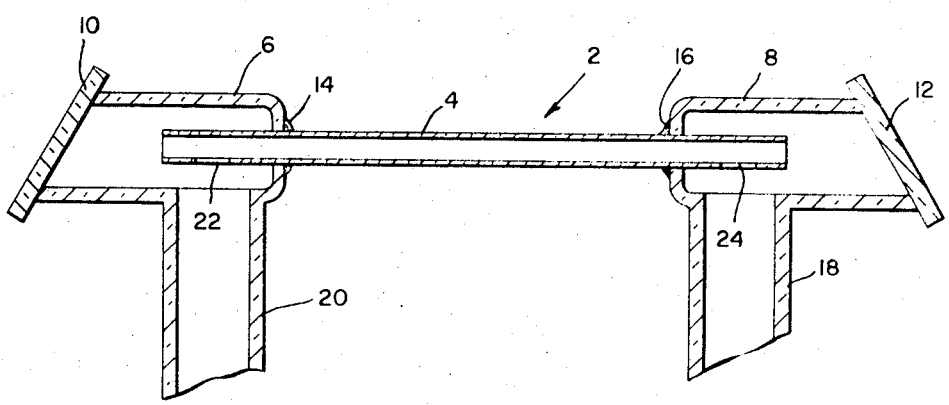
Robert H. Neusel,
INVENTOR.
BY.
ATTORNEY.

3,470,494
PULSED LASER
Robert H. Neusel, Palos Verdes Estates, Calif., assignor to TRW Inc., Redondo Beach, Calif., a corporation of Ohio
Filed Oct. 25, 1966, Ser. No. 589,387
Int. Cl. H01s 3/22
U.S. Cl. 331—94.5            4 Claims

ABSTRACT OF THE DISCLOSURE

A gas ion laser is described which minimizes fogging of the Brewster angle windows, particularly toward the cathode end of the tube. In one embodiment both ends of a longitudinal gas filled tube extend into and are sealed to enlarged tubes, the enlarged tubes containing the electrodes. The ends of the longitudinal tube extend into the enlarged tubes past the seal, and the longitudinal tube has an aperture adjacent at least one of its ends, between the seal and that end.

---

This invention relates to lasers.

More particular this invention relates to a gas ion laser having a construction whereby a longer active length between the Brewster windows is obtainable. In addition, this invention minimizes fogging of the Brewster windows, particularly toward the cathode end.

In recent years lasers have been developed which find utility in such areas as communications, medicine and metal working. The term "laser" stands for light amplification by stimulated emission of radiation. When lasers are stimulated by a suitable energy source, a coherent beam of light having a relatively high energy level is produced. Originally, lasers were of the solid state variety. An example is a cylindrical pink ruby containing traces of chromium. When the cylinder is irradiated by light from a flash lamp, a portion of the input energy is absorbed by the ruby and funneled into a narrow emission light of the trivalent chromium ion. One end of the ruby is made partially reflecting to allow the coherent beam to pass therethrough.

A later development in the laser field is in the area of chemical lasers. This type of laser is activated by the release of energy associated with the breaking and making of chemical bonds.

Another type of laser is the gas ion laser, and it is to this type to which this invention is directed. The gas ion laser usually consists of a narrow tube filled with a noble gas. Adjacent to each end of the tube is a Brewster window. Electrodes are also adjacent the ends of the tube and include a cathode and an anode. Population inversion is provided by an electric discharge between the cathode and anode.

In one design of this type of laser, there is a glass-to-ceramic seal. At this seal, there is an increase in diameter between each end of the small diameter ceramic tube and the glass portions containing the Brewster windows. The tube has apertures at each end through which the plasma propagates to the cathode and anode. The distance between the apertures constitutes the active length of the tube. In turn, the gain of the laser increases with tube length. In addition, the typical construction known in the art results in a sputtering or breaking away of the tube material at the point where the diameter changes from a small to a large value.

Much of this material propagates toward the Brewster window, particularly at the cathode end producing a fog. Additionally, a great amount of heat is produced at the constriction which often results in destruction of the glass-to-ceramic seal.

Briefly, this invention comprises a gas ion laser in which the ceramic active laser tube extends into the larger tube cavity past the glass-to-ceramic seal. Another feature comprises the provision for apertures short of the end of the tubes and which face the anode and cathode rather than the Brewster windows to allow plasma discharge through the apertures rather than the ends of the tube.

The objects and advantages of this invention will become apparent as this description proceeds taken in conjunction with the single drawing.

The drawing is a cross-sectional view of a laser device constructed according to this invention.

Referring to the drawing, there is shown generally at 2 a portion of a laser device constructed according to this invention. A small diameter tube is indicated at 4 which has a relatively long length relative to its diameter. An example is a tube having an internal diameter of 1.5 mm. and a length of 6.5 inches. This tube is preferably constructed of ceramic material such as Mullite MV 20 produced by McDanel Refractory Porcelain Company. Other examples are zircon, alumina and beryllia. Tube 4 is attached to glass tubes 6 and 8 by glass-to-ceramic seals 14 and 16 respectively. Tubes 6 and 8 are preferably formed of a uranium glass such as Corning Glass 3320 produced by the Corning Glass Works. Tubes 6 and 8 have Brewster windows 10 and 12 respectively. A cathode would be, for example, located in tube 18 and an anode in tube 20.

Many prior art examples show a similar structure except that tube 4 would terminate in the region of the glass-to-ceramic seals. This results in the development of fissures, particularly at the cathode end of the tube in the region of the seals. This is due to the change in diameter at this point. This not only structurally weakens the tube but in addition, due to propagation of the material toward the Brewster window, tends to fog the window. Also, when the total laser length is limited, the gain of the laser is limited by the active length. It is herefore advantageous in such circumstances to increase the active length without increasing total length.

Finally, failure is most likely to occur at the seal juncture when the constriction is also located there.

An example of one approach to solve the problem of destruction of the tubes is disclosed and claimed in my co-pending application having Ser. No. 569,226, entitled "Gas Ion Laser Device."

Referring again to FIG. 1, it can be seen that tube 4 extends past seals 14 and 16 to the interior of glass tubes 6 and 8 a relatively substantial distance. In addition, apertures 22 and 24 are provided between the ends of tube 4 and the respective glass-to-ceramic seal. Also, these apertures face the cathode and anode. In such a construction the following advantages present themselves. By increasing the tube length, a longer laser length is obtained which results in a net gain of the laser device. In addition, the hot spots at the ends of tube 4 are physically separated from the glass-to-ceramic seal, thus minimizing the problems of fissuring and contamination of the Brewster windows. In addition to increasing the tube length, it has been found that by having the aperture face the cathode, material sputtering away from the tube propagates toward the cathode rather than the Brewster window. An aperture can also be provided at 24 for the anode end, but this is not necessary.

What is claimed is:
1. A gas laser device comprising:
    a longitudinal gas filled tube, each end of which terminates in an enlarged tube, said enlarged tubes respectively having contained therein a cathode and an anode, each of said enlarged tubes being sealed to said longitudinal tube, at least one end of said longi- tudinal tube extending into one of said enlarged tubes past the seal between said enlarged tubes and said longitudinal tube, said longitudinal tube having an aperture adjacent said one end and between said one end and said seal.

2. A gas laser device according to claim 1 wherein said aperture faces said cathode.

3. A gas laser device according to claim 1 wherein said aperture faces said anode.

4. A gas laser device according to claim 1 where in the other end of said longitudinal tube extends into the other of said enlarged tubes past the seal between said other enlarged tube and said longitudinal tube, said longitudinal tube having an aperture adjacent said other end and between said other end and said seal.

References Cited
UNITED STATES PATENTS
3,404,349  10/1968  Rigrod _____ 331—94.5

RONALD L. WIBERT, Primary Examiner

R. J. WEBSTER, Assistant Examiner

U.S. Cl. X.R.

313—207